United States Patent [19]

Kitson

[11] 3,934,053

[45] Jan. 20, 1976

[54] CANDY FILLING WITH STABILIZED AROMA

[75] Inventor: John A. Kitson, Summerland, Canada

[73] Assignee: Canadian Patents and Development Limited, Ottawa, Canada

[22] Filed: Mar. 5, 1975

[21] Appl. No.: 556,501

[30] Foreign Application Priority Data

Mar. 8, 1974  Canada............................... 194449

[52] U.S. Cl. ................................................ 426/659
[51] Int. Cl.² .......................................... A23G 3/00
[58] Field of Search............................ 426/572, 659

[56]         References Cited
            UNITED STATES PATENTS 2,507,477   5/1950   MacDonald et al. ................ 426/659
3,024,115   3/1962   Loncar et al. ....................... 426/659

OTHER PUBLICATIONS

Leon, An Encyclopedia of Candy and Ice Cream Making, Chem. Pub. Co., New York, 1959, pp. 157–166, 375.

Bush & Co. Ed., Skuse's Complete Confectioner, Bush & Co., Ltd., London, England, 1957, pp. 160–169.

Primary Examiner—Jeanette M. Hunter
Attorney, Agent, or Firm—Sughrue, Rothwell, Mion, Zinn & Macpeak

[57]        ABSTRACT

The invention relates to an improved fondant or syrup with natural or artificial flavouring and to a method for the preparation thereof. In prior art processes, the fondants or syrups produced thereby generally have poor storage characteristics in that the flavour tends to be lost during storage at room temperatures. In the method of the present invention, this problem is overcome by heating a sugars-containing mixture to form a sugar polymers base, diluting the base with hot water to a total sugars content from about 85 to about 95%, and cooling and working the sugar polymers base to a smooth paste prior to blending the desired flavour and aroma essences therewith.

21 Claims, No Drawings

CANDY FILLING WITH STABILIZED AROMA

This invention relates to an improved fondant type chocolate filling or syrup with natural or artificial flavour, and further relates to a method for the preparation thereof.

Fondant type chocolate fillings with natural or artificial flavourings such as rum, brandy, or fruit flavours tend to lose flavour rapidly if stored at room temperature. Although, in factory storage, it is possible to keep the product at reduced temperatures of 50° – 60°F. and thus reduce flavour loss, it is not practical to maintain low temperatures in distribution. Thus, most of the desirable flavour may be lost within a few weeks of leaving the factory.

A typical method of preparing fondant according to conventional techniques is to heat a solution of sucrose, glucose and water until, by evaporation, the boiling temperature reaches approximately 115°C. The cooked syrup is cooled to approximately 38°C. and then worked or beaten to produce a smooth creamy paste which is free from coarse crystals. Flavoured fondant is then prepared therefrom by blending the flavour additive directly into the fondant, which has been heated to a pouring consistency or a temperature not exceeding 60°C. Citric or malic acid may be added at this point.

The problem with this conventional process is that the flavour compounds which are added at the elevated temperature of 60°C. or thereabouts, tend to lose some of their volatile components through evaporation. Furthermore, as stated above, cool storage is necessary to retain these volatile flavouring components in the fondant and significant loss thereof occurs when the product is transferred to a store or domestic environment, where temperatures may be relatively high. This flavour loss occurs because, in a fondant, the water-soluble flavouring materials are simply held in aqueous solution and an increase in temperature or decrease in water content both have the effect of reducing the solubility of the flavouring materials. In U.S. Pat. No. 3,695,896 (Sugisawa), there is taught a method of preparing a product which generally comprises heating a sugars-containing mixture comprising at least 50% sucrose to a temperature and for a period of time sufficient to cause formation of oligo-saccharides sugar polymers. The resultant product is cooled, and the desired flavour and aroma essences together with a binding agent are blended therewith. The final product having the flavour and aroma essences entrapped within the sugar polymer structure is then dried to less than 5% moisture content.

However, the Sugisawa process is concerned with the preparation of dry food-stuffs, wherein the volatile flavours and aromas are preserved in a stable, dry form. By contrast, it is normally required that fondant-type chocolate or candy fillings should be in the form of a paste or viscous fluid, and this is clearly contrary to the dehydration and drying aspect of the Sugisawa process. It has however, been discovered that an improved fondant, suitable for use as a chocolate or candy filling, may be prepared by forming a sugar polymer of the general type described by Sugisawa, and thereafter diluting the polymer syrup to reduce the solids content thereof, and cooling and working the polymer to produce a smooth paste. Flavouring material, such as water-soluble rum, brandy or fruit flavours, may then be added along with glycerin or other binding agents. The glycerin acts as a mutual solvent for both the sugar and the flavour compounds and serves to "lock" the aroma in the resultant fondant. The flavour is then released in the mouth when the fondant is eaten and diluted with saliva.

Thus, according to the present invention there is provided a process for the preparation of fondant or flavoured syrup which comprises the steps of heating a sugars-containing mixture to a temperature and for a period of time sufficient to cause formation of a sugar polymers base but insufficient to cause browning or caramelization, diluting the resultant sugar polymers base with hot water to a total sugars content of from about 85 to about 95%, cooling the sugar polymers base and working to a smooth paste, and blending with the paste desired flavour and aroma essences.

According to a further aspect of the invention, there is provided a flavoured fondant or syrup having improved flavour stability and prepared in accordance with the foregoing process.

The required sugar polymers base is comprised essentially of oligo-saccharides and may be prepared from several different sugars and sugar-containing products such as sucrose, corn syrup, maltose, dextrose, maltodextrin, dextrin, the hydrol byproduct of starch hydrolysate preparation, hydrogenated hydrol products, and mixtures thereof.

Starch hydrolysates such as corn-syrup, maltodextrin, and dextrin may be utilized in the starting materials. These substances are commonly differentiated by reference to their dextrose equivalent (D.E.), which is a measure of the copper reducing power calculated as dextrose and expressed as a percentage of the dry substance, usually written as D.E. 25 – 45 or as 25% – 45% dextrose equivalent. Malto-dextrin usually has a D.E. of 15 – 25, and dextrin a D.E. of 5 – 15. A lower value of the dextrose equivalent indicates a higher content of oligo-saccharides. Malto-dextrin comprises small amounts of dextrose and a large proportion of oligo-saccharides having alpha-1,4-linkages. The oligo-saccharides already present have the ability to trap flavour compounds within their complex stereostructure. Thus, the use of low-dextrose corn syrup and maltodextrin (up to about 100% by weight of the corn syrup) in the starting mixture lessens the temperature and heating time required for the formation of the sugar polymers.

Hydrol is a common technical term utilized to describe the supernatant liquid remaining after separation of dextrose crystal from starch hydrolysates. Hydrol is a byproduct from starch hydrolysates and contains dextrose and alpha- and beta-linked oligo-saccharides. For economic reasons it may be preferable to utilize hydrol or hydrogenated hydrol products in the starting mixtures.

The oligo-saccharides utilized for the flavour-locking are prepared by heating the sugars-containing mixture to a temperature and for a period of time sufficient to cause formation of the necessary sugar-polymer stereostructures. This is preferably accomplished by adding a small amount of water to the mixture, bringing the mixture to a boil, increasing the temperature gradually to about 140° – 145°C., and holding it there for approximately five minutes. Overheating at temperatures above 145°C. and for longer than about 5 minutes can cause sugar browning. It has also been found that heating at atmospheric pressure and at significantly lower temperatures but for long periods of time does not induce polymerization of the sugar molecules. Where oligo-saccharides are already present in the starting mixture, i.e. when malto-dextrin or dextrin is utilized, heating to a temperature of approximately 130°C. or less has been found sufficient to ensure the presence of the required sugar polymers and the molten state.

Following formation of the oligo-saccharide stereopolymers, hot water is added to the mixture to bring the total sugars content of the mixture to between 85% and about 95%. Preferably this is accomplished by cooling the mixture to less than about 120°C (usually approximately 90° – 110°C.) and adding the water. The addition of water to the sugars syrup at this higher temperature is preferred since it has been found that it tends to drive off any undesirable flavours from the sugars resulting from any minor caramelization, although the tendency for the sugars to caramelize has been reduced by avoiding prolonged heating at higher temperatures. It has also been found easier to adjust the sugars content of the molten sugar mixture at this temperature since the syrup becomes quite viscous upon cooling.

The sugars syrup containing the oligo-saccharides is then cooled further to below 100°C, preferably to room temperature (or about 20°C. – 40°C.) for the addition of the volatile food essences. Preferably, the essences are dissolved first in a binding agent, such as glycerin, of an amount sufficient to become about 0.5 to 10% of the final product. The binding agent may also be propylene glycol, polyethylene glycol, or mixtures thereof, and with glycerin. The binding agent acts as a solvent for both the sugars and the flavour compounds. The binding agent containing the flavour volatiles is then added to the cooled mixture containing the oligo-saccharide sugar polymers, and is stirred for sufficient time to achieve proper blending. Where easily volatilized compounds are employed, it is necessary to mix the flavour essences with the glycerin or other binding agents at about room temperature or at as low a temperature as possible to minimize the loss of such compounds. For example, temperatures in the neighbourhood of 50°C. will result in significant loss in the case of delicate fruit flavours.

The invention will now be described further by way of illustration only and with reference to the following examples.

EXAMPLE 1

The following mixture was formulated:

| | |
|---|---|
| glucose solids (dry) | 31.0% |
| maltodextrins (10 to 25% dextrose content - preferably 10%) | 2.5% |
| sucrose | 64.0% |
| water | 2.0 – 5.0% (preferably about 2.5%) |

The mixture was heated to between 140°C. and 145°C. and maintained at this temperature for 5 minutes. Hot water was added in portions equal to from 2 to 4% by weight of the molten sugar polymers mix. The water must be hot — 60°C. to 80°C. or higher — because cold water would set the polymer surface into a glass-like solid and further mixing would be impossible. The mixture was stirred continuously and the hot water added until a soluble solids level of from 85 to 95% (preferably no higher than 90%) was obtained. The mixture was then cooled to about 30°C. before the following flavouring mixture was added thereto:

| | |
|---|---|
| lemon oil | 2% |
| glycerin | 2% |
| ethyl alcohol | 2% |
| emulsifier | 0.1% |

Addition of the foregoing and admixture thereof with the sugar polymers base was continued until the aroma of lemon oil was faintly apparent.

It was found that in the foregoing experiment, the percentages of the sugars could be varied widely as follows:

| | |
|---|---|
| sucrose | 40 – 70% (preferably 60 – 70%) |
| maltodextrins | 0 – 50% (preferably 0 – 10%) |
| glucose | 10 – 50% (preferably 25 – 35%) |

Other sugars — such as maltose, etc., — could be used in proportions up to 30%. It was found that the use of higher proportions of maltodextrins permitted a somewhat lower heating temperature, generally of about 130°C., and shorter heating period, for the reasons hereinbefore explained.

EXAMPLE 2

The following mixture was formulated:

| | |
|---|---|
| corn syrup | 25% |
| maltodextrins (10 to 25% dextrose content-preferably 10%) | 30% |
| sucrose | 40% |
| water | 5% |

The sugar polymers base was formed by heating as in Example 1, and was adjusted by addition of hot water to a soluble solids content of from 85 to 90%. The mixture was then cooled to 120°C. or less, and from 0.1% to 1.0% SAIB (sucrose acetate isobutyrate) in ethanol added. The cooling of the mixture was continued to between 30°C. and 40°C., and from 0.1 to 1.0% orange flavour oil and 1% gum arabic dissolved in a minimum quantity of water was added. The addition, with mixing, was continued for five minutes.

In this example, it was found that the soluble solids content could be adjusted to be as high as 92% by addition of hot water and the mixture finally cooled to about 20°C., if desired, prior to working and blending with the flavour and aroma essences.

Furthermore, the operable ranges for the sugar-containing mixture ingredients were found to be as follows:

| | |
|---|---|
| corn syrup | 10 – 50% (preferably 20 – 30%) |
| maltodextrin | 10 – 40% (preferably 25 – 35%) |
| sucrose | 30 – 60% (preferably 40 – 50%) |
| water | 2 – 10% (preferably 2 – 5%) |

EXAMPLE 3

A sugar polymers base was prepared as in Example 2, except that the hot water was added to a soluble solids content of about 88 to 92% (preferably 92%). The viscous polymer was cooled to below about 100°C. and blended with 20% orange juice concentrate (72% soluble solids).

This product has similar flavour strength to orange juice. Less orange juice concentrate may be added and an orange oil flavoured polymer substituted, if desired.

EXAMPLE 4

A sugar polymers base was prepared as in Example 1, the soluble solids level being adjusted to between 85 and 90%. The mixture was cooled to 30°C. and 2% water-soluble strawberry essence (10,000 fold) mixed with 1 – 2% glycerin was added. The mixing was continued until the strawberry aroma disappeared. An artificial strawberry flavour could also be used, instead of strawberry essence, if required.

EXAMPLE 5

A sugar polymers base was prepared as in Example 1, and the soluble solids level adjusted to between 85 and 90%. After cooling the mixture to about 30°C., an artificial honey flavour, available from Stewart Bros. under the product designation No. 402, was added to a concentration of 0.2%, together with 0.2% glycerin.

EXAMPLE 6

A sugar polymers base was prepared as in Example 1, the soluble solids level again adjusted to between 85 and 90% and the mixture cooled to about 30°C. After cooling, a maple flavouring material (0.5%) and glycerin (0.5%) were added to the mixture.

EXAMPLE 7

A sugar polymers base was again prepared as in Example 1, the soluble solids level adjusted to between 85 and 90% and the mixture cooled to about 30°C. After cooling, coffee essence (0.5%) and glycerin (0.5%) were added to the mixture.

A further example of a fondant filling with stabilised aroma falling within the concept of the present invention is one which utilizes a starch gum as an encapsulating agent for oil based flavours instead of glycerin as specified in previous examples herein. One example of such a product is the orange flavoured candy filling which may be made in accordance with the example set out below:

EXAMPLE 8

A mixture of 58.3% sucrose, 28.0% glucose, 2.2% Maltrin 10 and 11.5% water was heated to between 140° and 145°C. and maintained at that temperature for five minutes. Hot water was added to the mixture in portions and amounts equal to from 2–4% by weight of the molten polymers mixture. It is important that the water used be hot and be of a temperature between 60°C. to 80°C. or higher. It will be appreciated that cold water would set the polymers mix into a glass-like solid and further mixing would be impossible. Hot water was added with continuous stirring until a soluble solids level of 80 to 90%, preferably no higher than 85% was obtained. The mixture was then cooled to about 20°C. and a flavouring mixture comprising 5% of orange oil and 5% of "Capsul" starch gum dissolved in 10% water heated to 140°F. was added thereto. The mixing of the ingredients to form a flavoured polymers paste was as in Example 1.

This mixture appears to provide better encapsulation of oil soluble flavours than the use of glycerin although the use of glycerin is equally good for water soluble flavours.

It will be appreciated by those skilled in the art, that the flavouring materials may be added in much higher concentrations than required in the end product and the highly flavoured products blended with unflavoured fondants to give the required final flavour concentration.

The stability of the flavoured polymer candy fillings of this invention is found to be good and it is possible, by using this process, to encapsulate flavouring materials at levels much higher than normally used for candy fillings. At lower encapsulation levels the flavour losses are still less than with conventional processes.

We claim:

1. A process for the preparation of fondant or flavoured syrup which comprises the steps of heating a sugars-containing mixture to a temperature and for a period of time sufficient to cause formation of a sugar polymers base but insufficient to cause browning or caramelization, diluting the resultant sugar polymers base with hot water to a total sugars content of from about 85 to about 95%, cooling the sugar polymers base and working same to a smooth paste, and blending with said paste desired flavour and aroma essences.

2. The process of claim 1, wherein said flavour and aroma essences are in a binding agent, which is also a mutual solvent for said sugar polymers base.

3. The process of claim 2, wherein said mutual solvent comprises glycerin.

4. The process of claim 1, wherein said flavour and aroma essences are water-soluble.

5. The process of claim 1, wherein said sugars-containing mixture is heated to about 140° to 145°C. for a period of about 5 minutes.

6. The process of claim 1, wherein said sugars-containing mixture contains at least one substance selected from the group consisting of glucose, sucrose, maltodextrin, dextrose and corn syrup.

7. The process of claim 1, wherein said sugars-containing mixture contains sucrose in an amount of from 40% to 70% by weight of the mixture.

8. The process of claim 1, wherein said hot water added to dilute said sugar polymers base is at a temperature of at least 60°C.

9. The process of claim 1, wherein said hot water is added to said sugar polymers base when said base is at a temperature of 120°C. or less.

10. The process of claim 1, wherein said sugar polymers base is cooled to below a maximum temperature of 100°C., before addition of flavour or aroma essences.

11. The process of claim 1, wherein said sugar polymers base is cooled to a temperature of from about 20°C. to about 40°C. before addition of flavour or aroma essences.

12. A process for the preparation of fondant which comprises the steps of heating a sugars-containing mixture comprising, by weight, from 40 to 70% sucrose; from 10 to 50% glucose; and maltodextrin in an amount from 0 to 50% by weight, to form a sugar polymers base, diluting the said base with hot water to a total sugars content of from about 85% to about 95%, cooling said mixture to below about 40°C. and working same to a smooth paste and blending with said paste desired flavour and aroma essences.

13. The process of claim 12, wherein said sugars-containing mixture comprises, by weight, about 25 to 35% dry glucose solids, up to 10% maltodextrin having a 10 to 25% dextrose content, about 60 to 70% sucrose, and about 2 to 5% water, said mixture being heated to a temperature between about 140° and 145°C. for a period of approximately 5 minutes to form said sugar polymers base, and said base being diluted with hot water added in portions equal to from 2 to 4% by weight of said sugar polymers base to give said soluble solids level of from 85 to 95%.

14. The process of claim 12, wherein said sugars-containing mixture comprises, by weight, about 31% dry glucose solids, about 2.5% maltodextrin having a 10% dextrose content, about 64% sucrose, and about 2.5% water, said mixture being heated to a temperature between about 140° and 145°C. for a period of approximately 5 minutes to form said sugar polymers base, and said base being diluted with hot water added in portions equal to from 2 to 4% by weight of said sugar polymers base to give said soluble solids level of from 85 to 90%.

15. The process of claim 12, wherein said flavour and aroma essences are in a binding agent, which is a mutual solvent for said sugar polymers base.

16. The process of claim 12, wherein said flavour and aroma essences are in a binding agent comprising glycerin.

17. The process of claim 12, wherein said flavour and aroma essences are pre-mixed and added as the following pre-mixed compositions:

| | |
|---|---|
| fruit flavor and aroma | 2% |
| glycerin | 2% |
| ethyl alcohol | 2% |
| emulsifier | 0.1% |

18. A process for the preparation of fondant which comprises the steps of heating a sugars-containing mixture comprising, by weight, about 10 to 50% corn syrup, about 10 to 40% maltodextrin having a 10 to 25% dextrose content, about 30 to 60% sucrose, and about 2 to 10% water, to form a sugar polymers base, diluting said base with hot water to a soluble solids content of from 85 to 92%, cooling said mixture to approximately 120°C. or less, adding from 0.1 to 1.0% sucrose ester and cooling said mixture further to between 20° and 40°C. working said mixture to a smooth paste and blending with said paste desired flavour and aroma essences.

19. A process for the preparation of fondant which comprises the steps of heating a sugars-containing mixture comprising, by weight, about 25% corn syrup, about 30% maltodextrin having a 10% dextrose content, about 40% sucrose, and about 5% water, to form a sugar polymers base, diluting said base with hot water to a soluble solids content of from 85 to 90%, cooling said mixture to 120°C. or less, adding from 0.1 to 1.0% sucrose ester and cooling said mixture further to between 30° and 40°C. working said mixture to a smooth paste and blending with said paste desired flavour and aroma essences.

20. A process for the preparation of fondant which comprises the steps of heating a sugars-containing mixture comprising, by weight, about 20 to 30% corn syrup, about 25 to 35% maltodextrin having a 10 to 25% dextrose content, about 40 to 50% sucrose, and about 2 to 5% water, to form a sugar polymers base, diluting said base with hot water to a soluble solids content of about 88 to 92%, cooling said mixture to below about 100°C., working same to a smooth paste and blending therewith desired flavour and aroma essences.

21. A process for the preparation of fondant which comprises the steps of heating a sugars-containing mixture comprising, by weight, about 25% corn syrup, about 30% maltodextrin having a 10% dextrose content, about 40% sucrose, and about 5% water, to form a sugar polymers base, diluting said base with hot water to a soluble solids content of about 92%, cooling said mixture to below 100°C., working same to a smooth paste and blending therewith desired flavour and aroma essences.

* * * * *